UNITED STATES PATENT OFFICE.

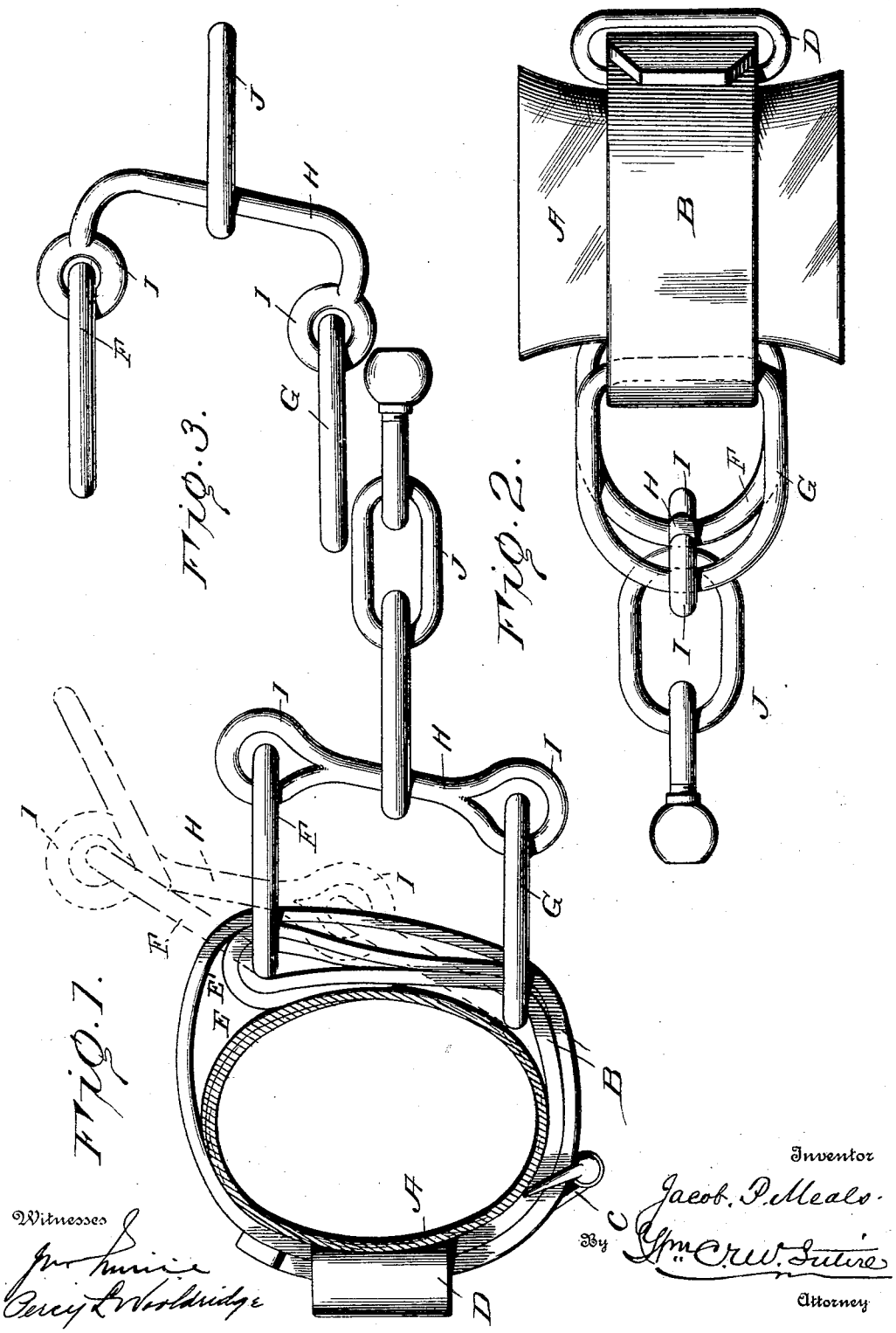

JACOB P. MEALS, OF RAWLINGS, WYOMING.

ANIMAL-HOPPLE.

SPECIFICATION forming part of Letters Patent No. 677,583, dated July 2, 1901.

Application filed May 4, 1901. Serial No. 58,723. (No model.)

*To all whom it may concern:*

Be it known that I, JACOB P. MEALS, a citizen of the United States, residing at Rawlings, in the county of Carbon and State of Wyoming, have invented certain new and useful Improvements in Animal-Hopples; and I do hereby declare the following to be a full, clear, and exact description of the invention, such as will enable others skilled in the art to which it appertains to make and use the same.

My invention relates to certain new and useful improvements in hopples for limiting the movements of the legs of horses and other animals while grazing and to restrain them from undue wandering or swift movement.

My invention has for its object to provide a hopple of simple and economic construction, which may be expeditiously applied to and released from the legs of the animal, and while admitting of the necessary limited or hoppled movement of the animal will at the same time prevent any tendency to chafe or to bruise the leg of the animal by the usual rotary or slipping movement of the fastening devices and their pads. The movement of the hoppled animals and the length of their natural steps vary to a large extent, and while the hopple-chain necessarily limits the length of the step or stride a concomitant disadvantage lies in the fact that the variations in the movements have to be accommodated by the rotary or slipping movement of the fastening-straps which encircle the leg, and consequently under the ordinary construction there is a likelihood of bruising or chafing the leg. My invention is designed to overcome this disadvantage; and it consists in the construction and arrangement hereinafter described by means of which all variations in the character and extent of the movement of the legs are compensated for by the movements of the devices interposed between the end links of the chain and the fastening devices encircling the legs of the animal, as will be hereinafter more fully described.

In order that those skilled in the art to which my invention appertains may fully understand the same, I will proceed to describe the construction and operation of my improved hopple, referring by letters to the accompanying drawings, in which—

Figure 1 is a plan view of my improved device with the fetlock-pads shown in section. Fig. 2 is a side elevation of the same, and Fig. 3 is a detail plan view showing a modification of the construction of the connecting-bar.

Similar letters of reference denote like parts in the several figures of the drawings.

A represents pads interposed between the securing-straps B and the leg of the animal in order that the straps may be tightly fastened without hurting the animal. These pads A may be secured to the fastening-straps B by rivets or in any other suitable manner, or they may be entirely independent therefrom, and in either case they preferably have their edges flared outwardly, as shown at Fig. 2, to prevent vertical displacement of said pads and at the same time to permit the free vibratory movement of the legs in the act of walking.

The fastening-straps B are provided with any suitable buckle C and a keeper D to maintain the straps in any given or proper adjustment. The inner end of the strap is folded upon itself to constitute a loop E, which may be strengthened and cushioned by a secondary loop or layer E'. Within the loop E is confined the straight vertical portion of a D-shaped link F, and a similar link G is secured in vertical parallelism with the link F by passing the strap through the same, as clearly shown at Fig. 1. The curved outer portions of the D-shaped links F and G are connected by a bar H, having eyes I at each end, as shown at Fig. 1, or of the form shown at Fig. 3. The bars are connected to one another by a chain J of suitable and predetermined length, and by preference a suitable swivel-joint K is placed between two of the links of the chain.

When the several parts are all connected and the hopple is properly secured to the legs of an animal and a step is made forward with the right leg, the D-shaped links F and G, bars H, and chain J will assume the relative positions shown in dotted lines at Fig. 1, and when the left leg moves forward the positions of the several parts will be reversed in an obvious manner, the D-shaped links vibrating like hinges upon the fastening-straps and carrying with their outer ends the bars H, while at the same time the links of the chain through which the bars H pass slide freely upon said bars from one to the other end as the animal moves. All tendency of the straps to rotate around the legs of the animal is thus avoided, and consequently said straps may be more securely fastened than could be done if it were necessary to provide for a slip movement of the same.

From the construction shown and described it will be seen that the movement of the chain which connects the straps together and constitutes the hopple is at all times and under varying conditions entirely independent of the securing-straps and pads, and consequently the latter remain in fixed relation with the legs of the animal. It will also be readily seen that should the securing-straps wear out new straps may be substituted and the hopple made as perfect as when originally manufactured and that this may be done without the intervention of a skilled mechanic or the use of any special tools or machinery, which is a matter of great importance when the devices are used in localities remote from business centers.

Having described the construction, operation, and advantages of my improved hopple, what I claim as new, and desire to secure by Letters Patent, is—

An improved hopple consisting of ordinary securing-straps and a connecting-chain, the end links of the chain and the securing-straps being connected together by means of vertically-disposed parallel links, connected at one end with the straps, and at the opposite end vibratively connected with a horizontal bar, the latter passing through the end link of the chain, substantially as and for the purpose set forth.

In testimony whereof I affix my signature in presence of two witnesses.

JACOB P. MEALS.

Witnesses:
N. R. GREENFIELD,
MAT BAROCH.